(12) United States Patent
Qin

(10) Patent No.: US 12,670,519 B2
(45) Date of Patent: Jun. 30, 2026

(54) CONTENT RECOMMENDATION USING RETRIEVAL AUGMENTED ARTIFICIAL INTELLIGENCE

(71) Applicant: Microsoft Technology Licensing, LLC, Redmond, WA (US)

(72) Inventor: Yinghua Qin, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 369 days.

(21) Appl. No.: 18/299,310

(22) Filed: Apr. 12, 2023

(65) Prior Publication Data

US 2024/0346566 A1      Oct. 17, 2024

(51) Int. Cl.
*G06Q 30/0601* (2023.01)
*G06F 40/134* (2020.01)
*G06F 40/40* (2020.01)

(52) U.S. Cl.
CPC ....... *G06Q 30/0631* (2013.01); *G06F 40/134* (2020.01); *G06F 40/40* (2020.01)

(58) Field of Classification Search
CPC ............ G06Q 30/0631; G06Q 30/0255; G06F 40/134; G06F 40/40; G06N 3/045
See application file for complete search history.

(56) References Cited

U.S. PATENT DOCUMENTS

| | | | | |
|---|---|---|---|---|
| 11,704,318 B1* | 7/2023 | Keivanloo | ............ | G06F 16/248 |
| | | | | 707/769 |
| 2006/0042483 A1* | 3/2006 | Work | .................... | H04L 67/306 |
| | | | | 101/91 |
| 2009/0070326 A1* | 3/2009 | Kraft | ...................... | G06Q 10/10 |
| | | | | 707/999.005 |
| 2014/0172744 A1* | 6/2014 | El-Hmayssi | ........... | G06Q 50/01 |
| | | | | 705/347 |
| 2016/0191639 A1* | 6/2016 | Dai | ....................... | H04L 67/306 |
| | | | | 709/204 |
| 2019/0205939 A1* | 7/2019 | Lal | ........................... | G06N 3/09 |
| 2021/0358007 A1* | 11/2021 | Zhang | ................ | G06Q 30/0631 |

(Continued)

OTHER PUBLICATIONS

Wang, L., & Lim, E. P. (2023). Zero-shot next-item recommendation using large pretrained language models. arXiv preprint arXiv: 2304.03153. (Year: 2023).*

(Continued)

*Primary Examiner* — Bhavesh M Mehta
*Assistant Examiner* — Philip H Lam
(74) *Attorney, Agent, or Firm* — Weaver IP L.L.C.

(57) ABSTRACT
Systems, methods, apparatuses, and computer program products are disclosed for using retrieval augmented artificial intelligence to provide content recommendations. A first feature vector is generated based at least on user contextual information. Second feature vectors are determined based on a comparison of the first feature vector to a plurality of second feature vectors. Content items corresponding to the determined second feature vectors are retrieved. An augmented prompt generated based on the user contextual information and the retrieved content items is provided to a large language model to request a recommendation. A content recommendation is received from the large language model based on the augmented prompt.

20 Claims, 6 Drawing Sheets

200

(56) References Cited

U.S. PATENT DOCUMENTS

2022/0012598 A1* 1/2022 Fok ........................ G06F 17/16

OTHER PUBLICATIONS

Gao, Y., Sheng, T., Xiang, Y., Xiong, Y., Wang, H., & Zhang, J. (2023). Chat-rec: Towards interactive and explainable IIms-augmented recommender system. arXiv preprint arXiv:2303.14524. (Year: 2023).*

Yuan, Z., Yuan, F., Song, Y., Li, Y., Fu, J., Yang, F., . . . & Ni, Y. (2023). Where to Go Next for Recommender Systems? ID-vs. Modality-based Recommender Models Revisited. arXiv e-prints, arXiv-2303. (Year: 2023).*

Li, L., Zhang, Y., & Chen, L. (2023). Personalized prompt learning for explainable recommendation. ACM Transactions on Information Systems, 41(4), 1-26. (Year: 2023).*

Peng, B., Galley, M., He, P., Cheng, H., Xie, Y., Hu, Y., . . . & Gao, J. (2023). Check your facts and try again: Improving large language models with external knowledge and automated feedback. arXiv preprint arXiv:2302.12813. (Year: 2023).*

Gao, et al., "Chat-REC: Towards Interactive and Explainable LLMs-Augmented Recommender System", In Repository of arXiv:2303. 14524v2, Apr. 4, 2023, 17 Pages.

International Search Report and Written Opinion received for PCT Application No. PCT/US2024/022701, Jun. 5, 2024, 12 pages.

Want, et al., "Zero-Shot Next-Item Recommendation using Large Pretrained Language Models", In Repository of arXiv:2304. 03153v1, Apr. 6, 2023, 5 Pages.

Yuan, et al., "Where to Go Next for Recommender Systems? ID- vs. Modality-based recommender models revisited", In Repository of arXiv:2303.13835v1, Mar. 24, 2023, 12 Pages.

International Preliminary Report On Patentability received for PCT Application No. PCT/US2024/022701, Oct. 23, 2025, 10 pages.

* cited by examiner

100

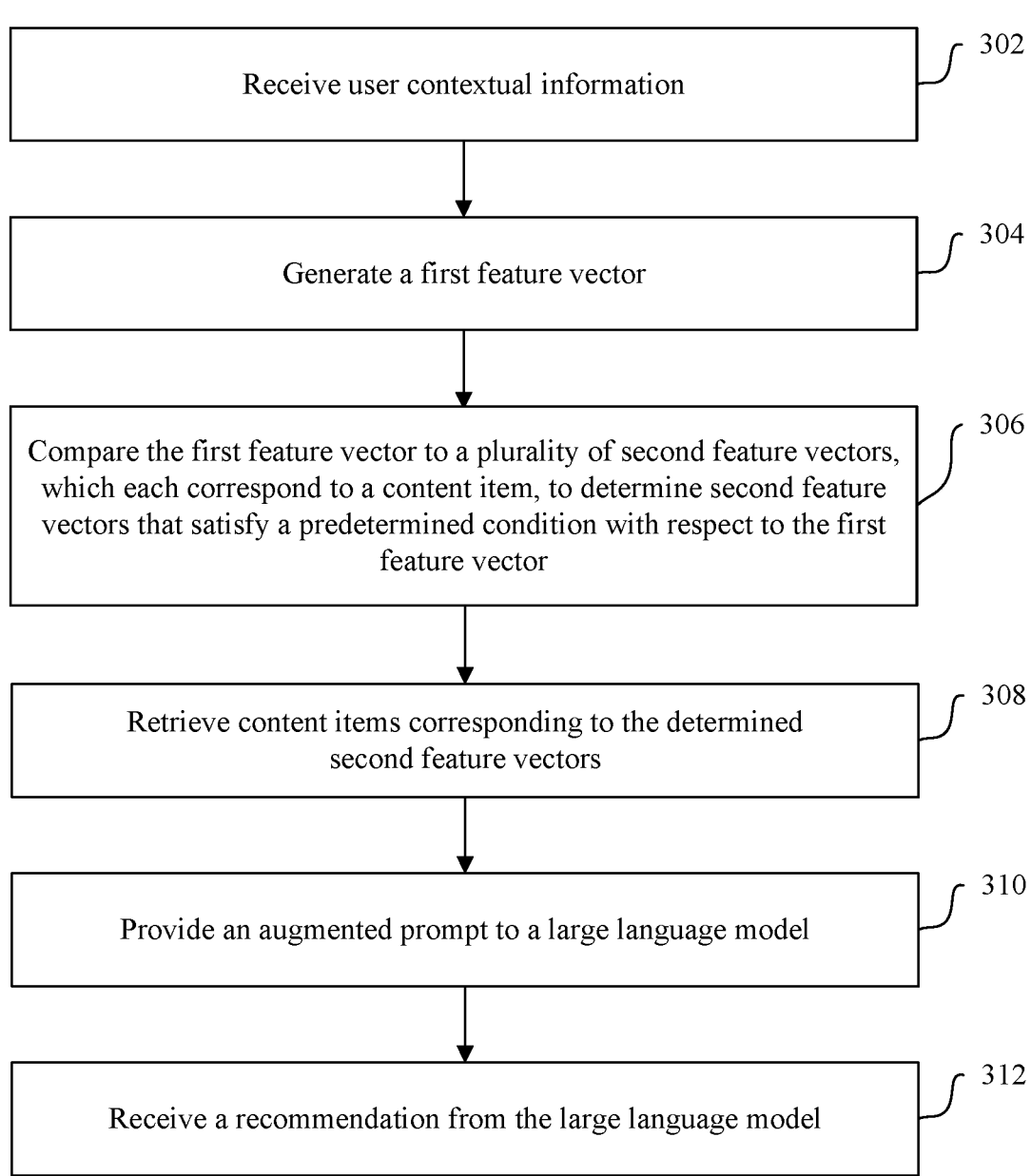

300

Receive user contextual information          302

Generate a first feature vector          304

Compare the first feature vector to a plurality of second feature vectors, which each correspond to a content item, to determine second feature vectors that satisfy a predetermined condition with respect to the first feature vector          306

Retrieve content items corresponding to the determined second feature vectors          308

Provide an augmented prompt to a large language model          310

Receive a recommendation from the large language model          312

Figures 4A, 4B, 5:
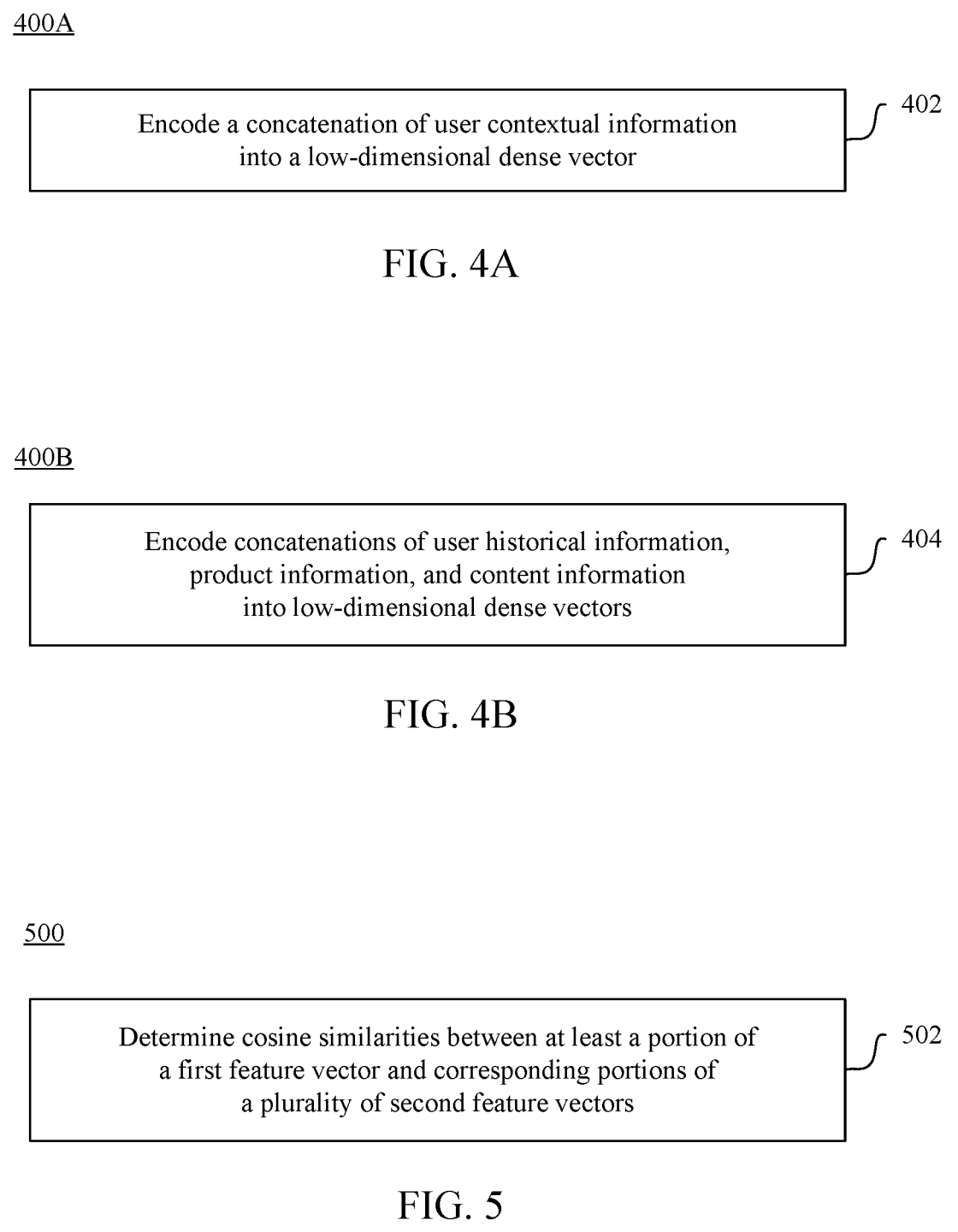

Encode a concatenation of user contextual information
into a low-dimensional dense vector          402

Encode concatenations of user historical information,
product information, and content information
into low-dimensional dense vectors          404

Determine cosine similarities between at least a portion of
a first feature vector and corresponding portions of
a plurality of second feature vectors          502

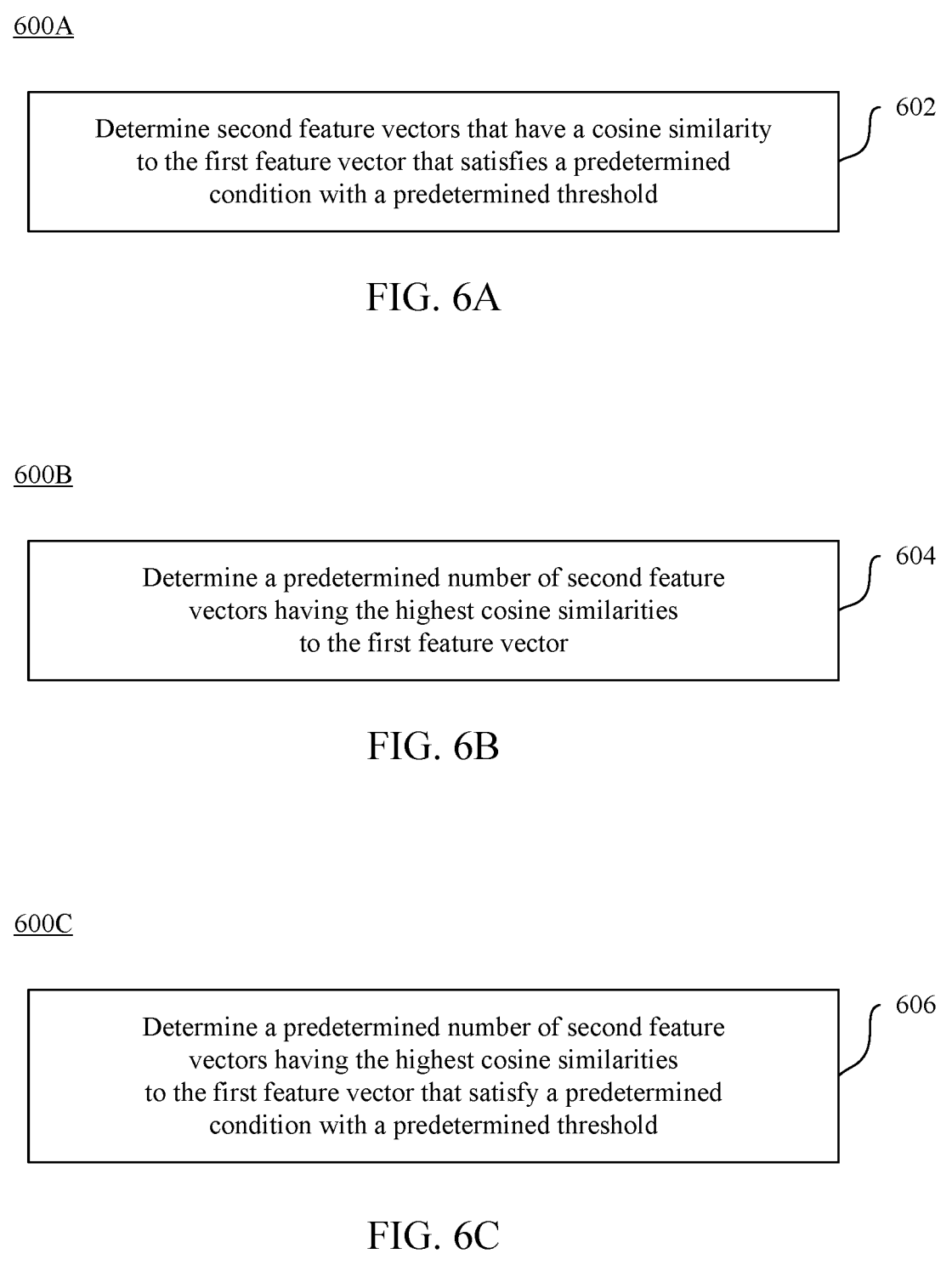

Determine second feature vectors that have a cosine similarity
to the first feature vector that satisfies a predetermined
condition with a predetermined threshold                                    602

Determine a predetermined number of second feature
vectors having the highest cosine similarities
to the first feature vector                                                 604

Determine a predetermined number of second feature
vectors having the highest cosine similarities
to the first feature vector that satisfy a predetermined
condition with a predetermined threshold                                    606

FIG. 6C

CONTENT RECOMMENDATION USING RETRIEVAL AUGMENTED ARTIFICIAL INTELLIGENCE

BACKGROUND

Large language models (LLM) are machine learning models designed to generate human-like text for a wide range of applications, including chatbots, language translation, and content creation. LLMs are typically trained on massive amounts of input text using deep learning algorithms, and can generate output text on a wide range of topics and subjects.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, apparatuses, and computer program products are disclosed for using retrieval augmented artificial intelligence to provide content recommendations. A first feature vector is generated based at least on user contextual information. The first feature vector is compared to a plurality of second feature vectors, which each correspond to a content item, to determine second feature vectors that satisfy a predetermined condition with respect to the first feature vector. Content items corresponding to the determined second feature vectors are retrieved. An augmented prompt, generated based on the user contextual information and the retrieved content items, is provided to a large language model to request a recommendation. A content recommendation is received from the large language model based on the augmented prompt.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 depicts a flowchart of a process for retrieval augmented content recommendation, in accordance with an embodiment.

FIGS. 4A and 4B depict flowcharts of processes for encoding low-dimensional dense vectors, in accordance with an embodiment.

FIG. 5 depicts a flowchart of a process for comparing feature vectors, in accordance with an embodiment.

FIGS. 6A-6C depict flowcharts of processes for selecting second feature vectors, in accordance with an embodiment.

Figure 1:
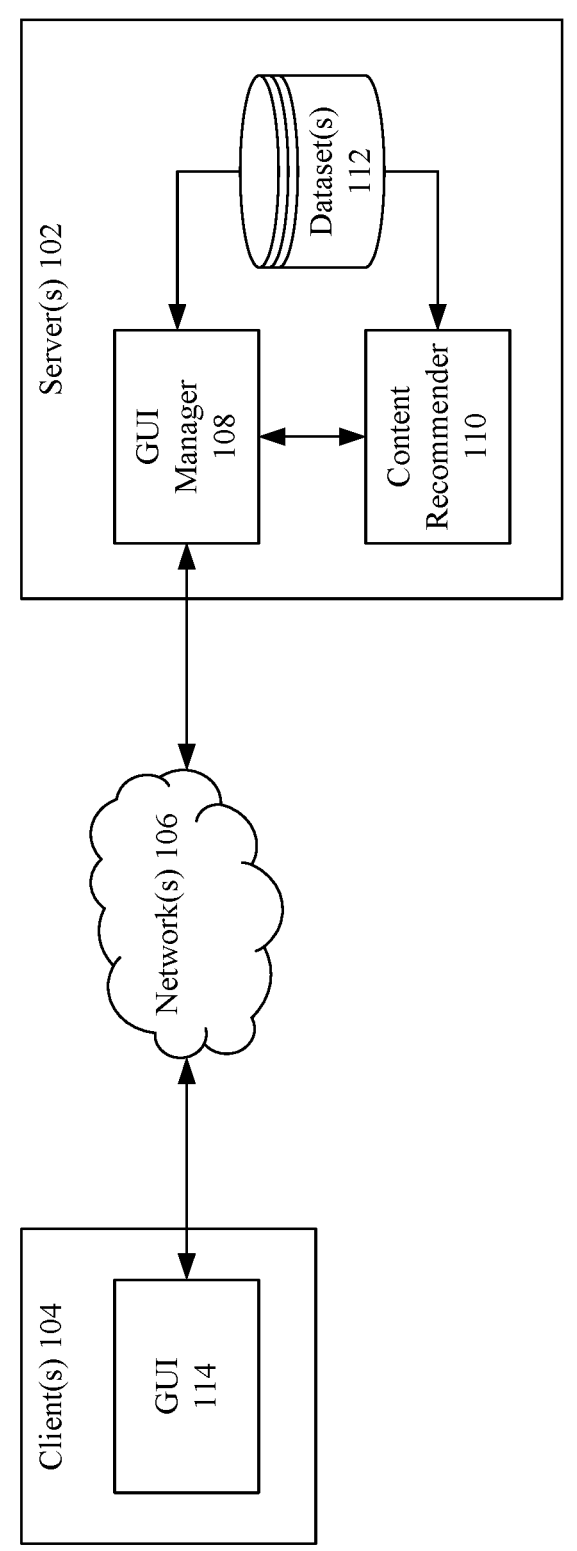
FIG. 1 shows a block diagram of an example system for retrieval augmented content recommendation, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Large language models (LLM) are machine learning models designed to generate human-like text for a wide range of applications, including chatbots, language translation, and content creation. LLMs are typically trained on massive amounts of input text using deep learning algorithms, and can generate output text on a wide range of topics and subjects. However, the knowledge of an LLM is limited by the information present in its training data. As such, responses from LLMs may not always be relevant or accurate.

Embodiments are described herein that leverage the ability of LLMs to generate improved content recommendations relative to current techniques. In an embodiment, a LLM is leveraged for an improved content recommendation by providing the LLM with an augmented prompt that includes contextual information (e.g., user historical or profile information, current webpage, temporal information, location information, product or service related to the current webpage), content information (e.g., recommendable content, contextual information related to the recommendable content, etc.), and a question requesting a content recommendation based on the included contextual information and the included content information. Based on the augmented prompt, the LLM may select the most relevant content in the content information and provide a summary of the selected content.

For example, in an embodiment, an LLM may recommend customer testimonials related to products or services. The LLM may recommend relevant testimonials based on a user contextual information, including, but not limited to, a user profile (e.g., their interests, browsing history, company profile, etc.), a product displayed on the current webpage, and/or content displayed on the current webpage (e.g., problem faced, product needs, product features, etc.). In an embodiment, the user contextual information may be explicitly provided by the user. For example, a user may provide such information when filling out a user profile. In an embodiment, user contextual information may also be obtained by monitoring user interactions and/or behavior (e.g., browsing history, cookies, etc., by user opt-in).

In such an embodiment, the user contextual information is used to search for customer testimonials from customers similar to the current user, that are related to the same product or service, and/or that are related to the same content (e.g., product features, problems solved, etc.). In an embodiment, matching customer testimonials are retrieved from storage and included in an augmented prompt that is provided to the LLM. The augmented prompt may include contextual information (e.g., user historical or profile information, current webpage, temporal information, location information, product or service related to the current webpage), content information (e.g., matching testimonials, etc.), and a question requesting a content recommendation based on the included contextual information and the included matching customer testimonials.

For instance, a non-augmented prompt presented to an LLM may include a single part, which may be a question, such as the following example:

Which products would you recommend to this customer? In contrast, a prompt generator configured according to an embodiment may generate the following augmented prompt, which includes three parts, including context, content, and a question, and thus includes two parts in addition to the non-augmented question:

Context: [user contextual (e.g., profile, browsing history, etc.), other contextual information (e.g., current webpage, product or service associated with the current webpage, time, location, etc.)].

Content: [Text of the matching content (e.g., customer testimonials)].

Question: What products and content would you recommend to the user based on the above content?

In an embodiment, the prompt generator provides the augmented prompt with the matching testimonials to the LLM. In an embodiment, the LLM receives the augmented prompt with the contextual information and the matching testimonials and generates a recommendation for the user.

In an embodiment, the LLM analyzes the generated string and the matching testimonials and recommends one or more of the matching testimonials. The LLM may generate a summary of each recommended testimonial along with a link to the recommended testimonial. The summaries of the recommended testimonials along with the corresponding links are displayed to the user on the current webpage, for example, as recommended testimonials related to the current webpage.

These and further embodiments are disclosed herein that enable the functionality described above and further such functionality. Such embodiments are described in further detail as follows.

For instance, FIG. 1 shows a block diagram of an example system 100 for generating a content recommendation using a retrieval augmented LLM, in accordance with an embodiment. As shown in FIG. 1, system 100 may include one or more servers 102 connected to one or more clients 104 via one or more networks 106. One or more of the servers 102 may further include a graphical user interface (GUI) manager 108, a content recommender 110, and one or more datasets 112. Each of the clients 104 may further include a GUI 114. These components of system 100 are described in further detail as follows.

Server(s) 102 may include any computing device suitable for performing functions that are ascribed thereto in the following description, as will be appreciated by persons skilled in the relevant art(s), including those mentioned elsewhere herein or otherwise known. Various example implementations of server(s) 102 are described below in reference to computing device 702, network-based server infrastructure 770, and/or on-premises servers 792 of FIG. 7.

Each of clients 104 may include any computing device suitable for performing functions that are ascribed thereto in the following description, as will be appreciated by persons skilled in the relevant art(s), including those mentioned elsewhere herein or otherwise known. Various example implementations of client(s) 104 and server(s) 102 are described below in reference to FIG. 7.

Network(s) 106 may comprise one or more networks such as local area networks (LANs), wide area networks (WANs), personal area network (PANs), enterprise networks, the Internet, etc., and may include wired and/or wireless portions. Server(s) 102 and client(s) 104 may be communicatively coupled via network(s) 106. Examples of network(s) 106 include those described below in reference to network 704 of FIG. 7.

GUI manager 108 may comprise one or more back-end components to communicate with GUI 114 on client(s) 104. In an embodiment, GUI manager 108 receives a request from GUI 114 and provides content to GUI 114 in a response to the request. For example, GUI manager 108 may access dataset(s) 112 to retrieve and/or generate content for the response. In embodiments, GUI manager 108 may also interact with content recommender 110 to determine content recommendations to include in the response.

Content recommender 110 provides content recommendations for inclusion in the response. In embodiments, content recommender 110 may receive user contextual information about the user of client(s) 104 and output content recommendations that are selected based on the user contextual information. In embodiments, content recommender 110 may generate the content recommendations based on information and/or content from dataset(s) 112. Content recommender 110 will be described in greater detail below in conjunction with FIG. 2.

Dataset(s) 112 may include one or more databases storing information and/or content necessary for responding to requests from GUI 114. In embodiments, data stored in dataset(s) 112 may include, but are not limited to, content, templates usable to generate dynamic content, user information (e.g., user profile, user historical information, etc.), and/or product or service information.

GUI 114 may comprise one or more front-end components to communicate with GUI manager 108 on server(s) 102. In embodiments, GUI 114 may include, but is not limited to, a web-based application, a webpage, a mobile application, a desktop application, a remotely executed server application, and the like.

Figure 2:
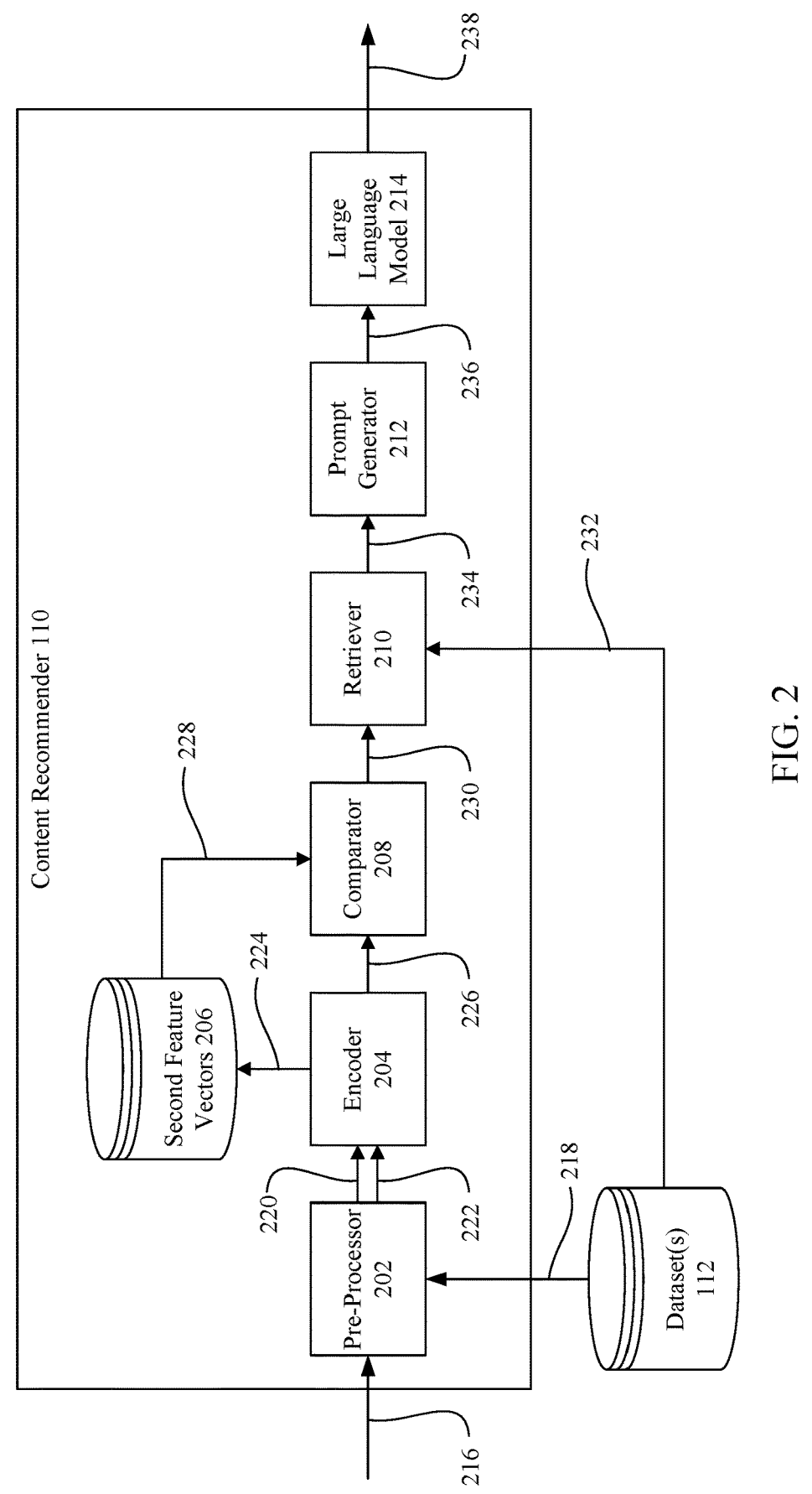
FIG. 2 shows a block diagram of an example system for retrieval augmented content recommendation, in accordance with an embodiment.

In embodiments, content recommender 110 employs an LLM to provide content recommendations. For instance, FIG. 2 shows a block diagram of an example system 200 for employing a retrieval augmented LLM for content recommendation in accordance with an embodiment. As shown in FIG. 2, system 200 includes content recommender 110 and dataset(s) 112 as shown and described with respect to FIG. 1. Content recommender 110 further includes a pre-processor 202, an encoder 204, a plurality of second feature vectors

206, a comparator 208, a retriever 210, a prompt generator 212, and a large language model (LLM) 214. These features of system 200 are described in further detail as follows.

Pre-processor 202 may receive user contextual information 216. In embodiments, user contextual information 216 may include, but is not limited to, a user identifier, user profile information, user location information, temporal information, product or service information, user intent information, and/or user interest information. For example, user contextual information may be included in a request from GUI 114, including, but not limited to, in a cookie that is included or identified in the request, in a webpage that is requested or identified by the request, or the like. In embodiments, user contextual information may also include data stored in dataset(s) 112 that are retrievable based on a user, device, and/or webpage identifier, and may include, but are not limited to, historical user information, user profile information, or the like.

In embodiments, pre-processor 202 may also receive content information 218 from dataset(s) 112. For example, content information 218 may include, but is not limited to, contextual information associated with recommendable content, product or service information associated with the recommendable content and/or the text corresponding to the recommendable content. In embodiments, content information 218 may include customer testimonials for a product or a service, contextual information for the customer that provided the customer testimonial, and/or product or service information associated with the customer testimonial.

In embodiments, pre-processor 202 may process user contextual information 216 to generate a user text string 220 based on user contextual information 216 and process content information 218 to generate a content text string 222 based on content information 218. In embodiments, pre-processor 202 may analyze user contextual information 216 and/or content information 218 to identify values for one or more parameters. For example, parameters may include, but are not limited to, one or more items of user and/or content contextual information, and/or one or more items of content. In embodiments, pre-processor 202 may generate user text string 220 and/or content text string 222 by concatenating the values in a predetermined order. In embodiments, parameters with undefined or null values may be represented by a special placeholder or blank space (e.g., " "). User text string 220 and/or content text string 222 are provided to encoder 204.

Encoder 204 may include one or more encoders that generate feature vectors based on a text string. For instance, encoder 204 may process user text string 220 to generate a first feature vector 226 that represents the meaning of user text string 220. Encoder 204 may provide first feature vector 226 to comparator 208. In embodiments, encoder 204 may also process a content text string 222 to generate a second feature vector 224 that represents the meaning of content text string 222. In embodiments, a second feature vector 224 may be generated for each piece of recommendable content in dataset(s) 112 and stored as second feature vectors 206 for future use. In embodiments, the generation of first feature vector 226 may prior to, concurrently, or after the generation of second feature vector 224.

In embodiments, encoder 204 may comprise a Generative Pre-Trained Transformer (GPT)-based or a Bidirectional Encoder Representations from Transformers (BERT)-based encoder. In embodiments, encoder 204 may tokenize user text string 220 and/or content text string 222 to generate a plurality of tokens. Encoder 204 may then generate embeddings for each token. In embodiments, the generated embeddings are numerical vectors that represent the meaning of the tokens. Encoder 204 may then aggregate the embeddings for each token to form a sentence embedding vector that represents the meaning of the text. For example, first feature vector 226 and/or second feature vector 224 may include, but are not limited to, low-dimensional dense vectors that are generated using dense embedding models (e.g., Word2Vec or the like) and/or transformer models (e.g., BERT).

Comparator 208 may include one or more comparators configured to determine the similarity between two feature vectors. In an embodiment, comparator 208 receives first feature vector 226 from encoder 204 and second feature vectors 228 from second feature vectors 206, and compares first feature vector 226 to second feature vectors 228 to determine the similarity between first feature vector 226 and second feature vectors 228. For example, comparator 208 may calculate a cosine similarity between first feature vector 226 and each second feature vector 228 to determine second feature vectors that are most similar to first feature vector 226. In embodiments, the cosine similarity is a value between negative one ($-1.0$) and one ($1.0$), inclusively, with a value of negative one indicating directly opposite feature vectors, a value of zero indicating no similarity between the feature vectors and a value of one indicating identical feature vectors (or portions thereof).

In embodiments, comparator 208 determines the cosine similarity based on the entirety of the first feature vector. In other embodiments, comparator 208 may calculate the cosine similarity based on portions of first feature vector 226. For example, comparator 208 may calculate the cosine similarity between the portions of first feature vector 226 corresponding to known user contextual information and the corresponding portions of second feature vectors 228. In embodiments, comparator 208 may ignore or omit portions of first feature vector 226 corresponding to unknown or null parameters from the cosine similarity calculation. For example, continuing with the example presented above, when recommending content for an unknown user, content recommender 110 may ignore portions of the first feature vector corresponding to unknown parameters related to the identity of the user and instead calculate the cosine similarity based on portions of the first feature vector corresponding to the product or service, and/or the content of the current webpage.

In embodiments, comparator 208 provides one or more indications 230 to retriever 210. For example, indication(s) 230 may include, but are not limited to, identifiers of second feature vectors that are most similar to first feature vector 226 along with a corresponding cosine similarity score indicating the similarity to first feature vector 226, and/or identifiers of content items that correspond to the second feature vectors 228 that are most similar to first feature vector 226.

Retriever 210 may be configured to determine and retrieve recommendable content items from dataset(s) 112. In embodiments, retriever 210 may receive and analyze indication(s) 230 to identify and retrieve one or more content items 232 from dataset(s) 112. For example, retriever 210 may identify and retrieve content item(s) 232 that correspond to the second feature vectors having a cosine similarity to the first feature vector that satisfies a first predetermined relationship with a first predetermined threshold, that correspond to a first predetermined number of second feature vectors having the highest cosine similarities to the first feature vector, and/or that correspond to a second predetermined number of second feature vectors having the highest cosine similarities to the first feature vector that satisfy a second predetermined relationship with a second predetermined threshold. In embodiments, retriever 210 may provide content item(s) 232 (e.g., customer testimonials) to prompt generator 212 as part of contextual information 234. In embodiments, contextual information 234 may further include one or more of user contextual information 216, first feature vector 226, one or more of second feature vectors 228, and/or indication(s) 230.

Prompt generator 212 may generate an augmented prompt for LLM 214 based on one or more of user contextual information 216, first feature vector 226, one or more of second feature vectors 228, indication(s) 230, and/or content item(s) 232. For example, prompt generator 212 may generate an augmented prompt 236 that includes contextual information (e.g., user contextual information), content information (e.g., recommendable content), and a question requesting a content recommendation based on the provided contextual information using the included content information. For example, prompt generator 212 may employ natural language processing (NLP) techniques to generate augmented prompt 236 that describes the user, the current webpage, the product or service related to the current webpage, and requests a content recommendation for the user based on content item(s) 232). In embodiments, augmented prompt 236 may include, identify and/or link to content item(s) 232. Prompt generator 212 provides augmented prompt 236 to LLM 214.

In embodiments, LLM 214 receives augmented prompt 236 from prompt generator 212 and generates one or more recommendations 238. For example, LLM 214 may process augmented prompt 236 to determine content item(s) 232 that are most relevant to the user based on the contextual information included in augmented prompt 236. In embodiments, LLM 214 may generate a summary of each recommended content item and include the generated summaries in recommendation(s) 238 along with a link to the recommended content items (e.g., a link to a webpage for a customer testimonial).

Embodiments described herein may operate in various ways to generate content recommendations using a retrieval augmented LLM. For instance, FIG. 3 depicts a flowchart 300 of a process for generating content recommendation using a retrieval augmented LLM, in accordance with an embodiment. Server(s) 102 of FIG. 1 and/or content recommender 110 of FIGS. 1 and 2 may operate according to flowchart 300, for example. Note that not all steps of flowchart 300 may need to be performed in all embodiments, and in some embodiments, the steps of flowchart 300 may be performed in different orders than shown. Flowchart 300 is described as follows with respect to FIGS. 1 and 2 for illustrative purposes.

Flowchart 300 starts at step 302. In Step 302, user contextual information is received. For instance, pre-processor 202 of content recommender 110 may receive user contextual information 216. As described above, user contextual information 216 may include, but is not limited to, a user identifier, user profile information, user location information, temporal information, user intent information, and/or user interest information. For example, user contextual information may be included in a request from GUI 114, including, but not limited to, in a cookie that is included or identified in the request, in a webpage that is requested or identified by the request, or the like. In embodiments, user contextual information may also include data stored in dataset(s) 112 that are retrievable based on a user, device, and/or webpage identifier, and may include, but are not limited to, historical user information, user profile information, or the like. In embodiments, pre-processor 202 generates a user text string 220 based on user contextual information 216 and provides user text string 220 to encoder 204.

In step 304, a first feature vector is generated. For instance, encoder 204 may generate first feature vector 226 that represents the meaning of user text string 220. As discussed above, encoder 204 may comprise a GPT-based or a BERT-based encoder that is configured to generate low-dimensional dense vectors. In embodiments, encoder 204 provides first feature vector 226 to comparator 208.

In step 306, the first feature vector is compared to a plurality of second feature vectors, which each correspond to a content item, to determine second feature vectors that satisfy a predetermined condition with respect to the first feature vector. For instance, comparator 208 may compare first feature vector 226 to a plurality of second feature vectors 228. As discussed above, comparator 208 may calculate a cosine similarity between first feature vector 226 and each second feature vector 228 to determine the second feature vectors that are most similar to first feature vector 226. In embodiments, comparator 208 determines the cosine similarity based on the entirety of the first feature vector. In embodiments, comparator 208 may calculate the cosine similarity based on portions of first feature vector 226. For example, comparator 208 may calculate the cosine similarity between the portions of first feature vector 226 corresponding to known user contextual information and the corresponding portions of second feature vectors 228. As discussed above, the determined second feature vectors may include second feature vectors having a cosine similarity to the first feature vector that satisfies a first predetermined relationship with a first predetermined threshold, second feature vectors that correspond to a first predetermined number of second feature vectors having the highest cosine similarities to the first feature vector, and/or second feature vectors that correspond to a second predetermined number of second feature vectors having the highest cosine similarities to the first feature vector that satisfy a second predetermined relationship with a second predetermined threshold. In embodiments, comparator 208 may provide, to retriever 210, indication(s) 230 that correspond to the second feature vectors 228 that are most similar to first feature vector 226. As discussed above, indication(s) 230 may include, but are not limited to, identifiers of second feature vectors that are most similar to first feature vector 226 along with a corresponding cosine similarity score indicating the similarity to first feature vector 226, and/or identifiers of content items that correspond to the second feature vectors 228 that are most similar to first feature vector 226.

In step 308, content items corresponding to the determined second feature vectors are retrieved. For instance, retriever 210 may retrieve content item(s) 232 from dataset(s) 112 that correspond to the indication(s) 230. As discussed above, retriever 210 may analyze indication(s) 230 received from comparator 208 to identify and retrieve one or more content item 232 from dataset(s) 112. For example, retriever 210 may identify and retrieve content item(s) 232 that correspond to the second feature vectors having a cosine similarity to the first feature vector that satisfies a first predetermined relationship with a first predetermined threshold, that correspond to a first predetermined number of second feature vectors having the highest cosine similarities to the first feature vector, and/or that correspond to a second predetermined number of second feature vectors having the highest cosine similarities to the first feature vector that satisfy a second predetermined relationship with a second predetermined threshold. In embodiments, retriever 210 may provide content item(s) 232 to prompt generator 212 as part of contextual information 234. In embodiments, contextual information 234 may further include one or more of user contextual information 216, first feature vector 226, one or more of second feature vectors 228, and/or indication(s) 230.

In step 310, an augmented prompt is provided to a large language model. For instance, prompt generator 212 may generate and provide augmented prompt 236 to LLM 214. As discussed above, prompt generator 212 may employ natural language processing (NLP) techniques to generate a prompt 236 that describes the user, the current webpage of the user, the product or service related to the current webpage, and requests a content recommendation for the user based on content item(s) 232. In embodiments, prompt 236 may include, identify and/or link to content item(s) 232.

In step 312, a recommendation is received from the large language model. For instance, GUI manager 108 may receive from content recommender 110 recommendation(s) 238 that are generated by LLM 214. As discussed above, LLM 214 may process augmented prompt 236 to determine content item(s) 232 that are most relevant to the user based on the contextual information included in augmented prompt 236. In embodiments, LLM 214 may generate a summary of each recommended content item and include the generated summary in recommendation(s) 238 along with a link to the recommended content items.

Embodiments disclosed herein may operate in various ways to encode a text string into low-dimensional dense vectors. For instance, FIGS. 4A and 4B depict flowcharts 400A and 400B, respectively, of processes for encoding text strings into low-dimensional dense vectors, in accordance with an embodiment. Server(s) 102 of FIG. 1 and/or encoder 204 of content recommender 110 of FIGS. 1 and 2 may operate according to flowcharts 400A and 400B, for example. Flowcharts 400A and 400B are described as follows with respect to FIGS. 1 and 2 for illustrative purposes.

Flowchart 400A starts at step 402. In step 402, a concatenation of user contextual information is encoded into a low-dimensional dense vector. For instance, encoder 204 may encode user text string 220 into first feature vector 226. As discussed above, user text string 220 may include a concatenation of textual parameters that include, but are not limited to, a user identifier, user profile information, user location information, temporal information, user intent information, and/or user interest information. In embodiments, encoder 204 tokenize user text string 220 into tokens and generate embeddings comprising numerical vectors for each token. Encoder 204 may then aggregate the embeddings for each token to form first feature vector 226 that represents the meaning of user text string 220.

Flowchart 400B starts at step 404. In step 402, a concatenation of user historical information, product information, and content information is encoded into a low-dimensional dense vector. For instance, encoder 204 may encode content text string 222 into second feature vector 224. As discussed above, content text string 222 may include a concatenation of textual parameters that include, but are not limited to, contextual information associated with recommendable content, product or service information associated with the recommendable content, and/or the text corresponding to the recommendable content. In embodiments, encoder 204 tokenize content text string 222 into tokens and generate embeddings comprising numerical vectors for each token. Encoder 204 may then aggregate the embeddings for each token to form second feature vector 224 that represents the meaning of content text string 222. In embodiments, encoder 204 may generate a second feature vector 224 for each piece of recommendable content in dataset(s) 112 and store the generated second feature vectors 224 as second feature vectors 206 for future use.

Embodiments disclosed herein may operate in various ways to compare a first feature vector to second feature vectors. For instance, FIG. 5 depicts a flowchart 500 of a process for determining cosine similarities between a first feature vector and a plurality of second feature vectors, in accordance with an embodiment. Server(s) 102 of FIG. 1 and/or comparator 208 of content recommender 110 of FIGS. 1 and 2 may operate according to flowchart 500, for example. Flowchart 500 is described as follows with respect to FIGS. 1 and 2 for illustrative purposes.

Flowchart 500 starts at step 502. In step 502, cosine similarities are determined between at least a portion of a first feature vector and corresponding portions of a plurality of second feature vectors. For instance, comparator 208 may determine cosine similarities between at least a portion of first feature vector 226 and corresponding portions of second feature vectors 228. As discussed above, comparator 208 may determine the cosine similarity based on all or portions of the first feature vector. In embodiments, comparator 208 may calculate the cosine similarity between the portions of first feature vector 226 corresponding to known user contextual information and the corresponding portions of second feature vectors 228. In embodiments, comparator 208 may ignore or omit portions of first feature vector 226 corresponding to unknown or null parameters from the cosine similarity calculation. To calculate cosine similarity between the first feature vector 226 and a second feature vector 228, we divide the dot product of the two vectors by the product of the magnitudes of the two vectors. The resulting value is the cosine of the angle between the two vectors with a value between −1.0 and 1.0, inclusive. This cosine value is a measure of similarity, where 1.0 means the vectors are identical, 0.0 means they are orthogonal (i.e., unrelated), and −1.0 means they are opposite.

Embodiments disclosed herein may operate in various ways to determine second feature vectors that are similar to a first feature vector. For instance, FIGS. 6A-6C depict flowcharts 600A-600C, respectively, of processes for determining second feature vectors based on their cosine similarity to a first feature vector, in accordance with an embodiment. Server(s) 102 of FIG. 1 and/or comparator 208 and/or retriever 210 of content recommender 110 of FIGS. 1 and 2 may operate according to flowcharts 600A-600C, for example. Note that not all steps of flowcharts 600A-600C may need to be performed in all embodiments, and in some embodiments, the steps of flowcharts 600A-600C may be performed in the alternative. Flowcharts 600A-600C are described as follows with respect to FIGS. 1 and 2 for illustrative purposes.

Flowchart 600A starts at step 602. In step 602, second feature vectors that have a cosine similarity to the first feature vector that satisfies a predetermined condition with a predetermined threshold are determined. For instance, comparator 208 may calculate the cosine similarities between first feature vector 226 and a plurality of second feature vectors 228. Comparator 208 and/or retriever 210 may determine second feature vectors having calculated cosine similarities that satisfy a predetermined condition with a predetermined threshold. For example, comparator 208 and/or retriever 210 may determine second feature vectors having a calculated cosine similarity values greater than a predetermined threshold (e.g., 0.8).

Flowchart 600B starts at step 604. In step 604, a predetermined number of second feature vectors that have the highest cosine similarity to the first feature vector are determined. For instance, comparator 208 may calculate the cosine similarities between first feature vector 226 and a plurality of second feature vectors 228. Comparator 208 and/or retriever 210 may determine a predetermined number (e.g., 3) of second feature vectors having the highest calculated cosine similarities.

Flowchart 600C starts at step 606. In step 606, a predetermined number of second feature vectors that have a cosine similarity to the first feature vector that satisfies a predetermined condition with a predetermined threshold are determined. For instance, comparator 208 may calculate the cosine similarities between first feature vector 226 and a plurality of second feature vectors 228. Comparator 208 and/or retriever 210 may determine a predetermined number of second feature vectors having calculated cosine similarities that satisfy a predetermined condition with a predetermined threshold. For example, comparator 208 and/or retriever 210 may determine the four (or any other number of) second feature vectors having calculated cosine similarities greater than a predetermined threshold (e.g., 0.7). In embodiments, the predetermined number, the predetermined condition and/or the predetermined threshold associated with flowchart 600C may be the same as, or different from, the predetermined number, the predetermined condition and/or the predetermined threshold associated with flowcharts 600A and/or 600B.

III. Example Mobile Device and Computer System Implementation

The systems, methods, and computer-readable storage devices described above in reference to FIGS. 1-6, server(s) 102, client(s) 104, network(s) 106, GUI manager 108, content recommender 110, dataset(s) 112, GUI 114, preprocessor 202, encoder 204, database of second feature vectors 206, comparator 208, retriever 210, prompt generator 212, large language model 214, and/or each of the components described therein, and/or the steps of flowcharts 300, 400A, 400B, 500, 600A, 600B, 600C may be each implemented as computer program code/instructions configured to be executed in one or more processors and stored in a computer readable storage medium. Alternatively, server(s) 102, client(s) 104, network(s) 106, GUI manager 108, content recommender 110, dataset(s) 112, GUI 114, preprocessor 202, encoder 204, database of second feature vectors 206, comparator 208, retriever 210, prompt generator 212, large language model 214, and/or each of the components described therein, and/or the steps of flowcharts 300, 400A, 400B, 500, 600A, 600B, 600C may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
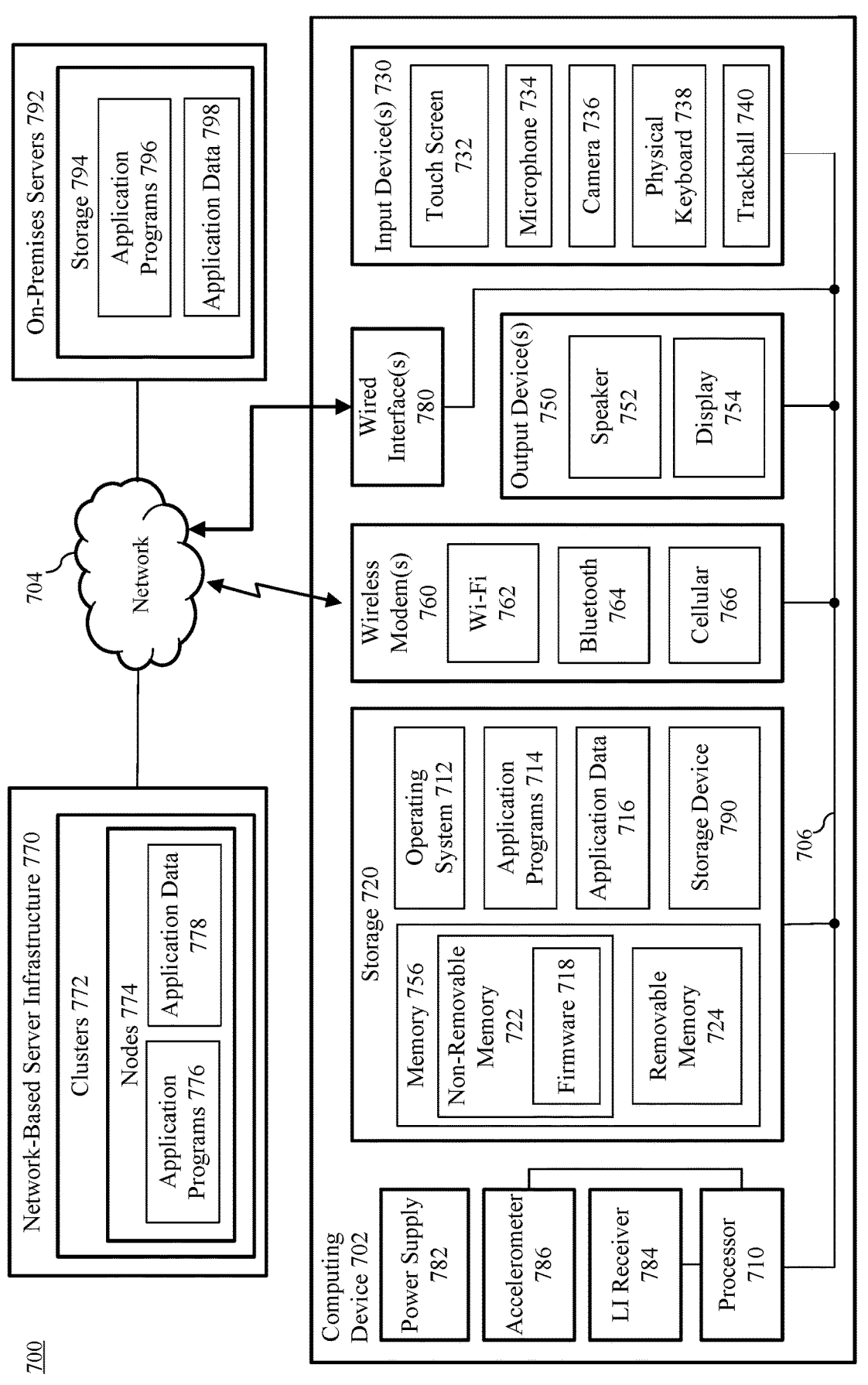
FIG. 7 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 7. FIG. 7 shows a block diagram of an exemplary computing environment 700 that includes a computing device 702. In some embodiments, computing device 702 is communicatively coupled with devices (not shown in FIG. 7) external to computing environment 700 via network 704. Network 704 comprises one or more networks such as local area networks (LANs), wide area networks (WANs), enterprise networks, the Internet, etc., and may include one or more wired and/or wireless portions. Network 704 may additionally or alternatively include a cellular network for cellular communications. Computing device 702 is described in detail as follows.

Computing device 702 can be any of a variety of types of computing devices. For example, computing device 702 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Quest 2® by Reality Labs, a division of Meta Platforms, Inc, etc.), or other type of mobile computing device. Computing device 702 may alternatively be a stationary computing device such as a desktop computer, a personal computer (PC), a stationary server device, a minicomputer, a mainframe, a supercomputer, etc.

As shown in FIG. 7, computing device 702 includes a variety of hardware and software components, including a processor 710, a storage 720, one or more input devices 730, one or more output devices 750, one or more wireless modems 760, one or more wired interfaces 780, a power supply 782, a location information (LI) receiver 784, and an accelerometer 786. Storage 720 includes memory 756, which includes non-removable memory 722 and removable memory 724, and a storage device 790. Storage 720 also stores an operating system 712, application programs 714, and application data 716. Wireless modem(s) 760 include a Wi-Fi modem 762, a Bluetooth modem 764, and a cellular modem 766. Output device(s) 750 includes a speaker 752 and a display 754. Input device(s) 730 includes a touch screen 732, a microphone 734, a camera 736, a physical keyboard 738, and a trackball 740. Not all components of computing device 702 shown in FIG. 7 are present in all embodiments, additional components not shown may be present, and any combination of the components may be present in a particular embodiment. These components of computing device 702 are described as follows.

A single processor 710 (e.g., central processing unit (CPU), microcontroller, a microprocessor, signal processor, ASIC (application specific integrated circuit), and/or other physical hardware processor circuit) or multiple processors 710 may be present in computing device 702 for performing such tasks as program execution, signal coding, data processing, input/output processing, power control, and/or other functions. Processor 710 may be a single-core or multi-core processor, and each processor core may be single-threaded or multithreaded (to provide multiple threads of execution concurrently). Processor 710 is configured to execute program code stored in a computer readable medium, such as program code of operating system 712 and application programs 714 stored in storage 720. Operating system 712 controls the allocation and usage of the components of computing device 702 and provides support for one or more application programs 714 (also referred to as "applications"

or "apps"). Application programs 714 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 702 can communicate with any other component according to function, although not all connections are shown for ease of illustration. For instance, as shown in FIG. 7, bus 706 is a multiple signal line communication medium (e.g., conductive traces in silicon, metal traces along a motherboard, wires, etc.) that may be present to communicatively couple processor 710 to various other components of computing device 702, although in other embodiments, an alternative bus, further buses, and/or one or more individual signal lines may be present to communicatively couple components. Bus 706 represents one or more of any of several types of bus structures, including a memory bus or memory controller, a peripheral bus, an accelerated graphics port, and a processor or local bus using any of a variety of bus architectures.

Storage 720 is physical storage that includes one or both of memory 756 and storage device 790, which store operating system 712, application programs 714, and application data 716 according to any distribution. Non-removable memory 722 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 722 may include main memory and may be separate from or fabricated in a same integrated circuit as processor 710. As shown in FIG. 7, non-removable memory 722 stores firmware 718, which may be present to provide low-level control of hardware. Examples of firmware 718 include BIOS (Basic Input/Output System, such as on personal computers) and boot firmware (e.g., on smart phones). Removable memory 724 may be inserted into a receptacle of or otherwise coupled to computing device 702 and can be removed by a user from computing device 702. Removable memory 724 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 790 may be present that are internal and/or external to a housing of computing device 702 and may or may not be removable. Examples of storage device 790 include a hard disk drive, a SSD, a thumb drive (e.g., a USB (Universal Serial Bus) flash drive), or other physical storage device.

One or more programs may be stored in storage 720. Such programs include operating system 712, one or more application programs 714, and other program modules and program data. Examples of such application programs may include, for example, computer program logic (e.g., computer program code/instructions) for implementing one or more of server(s) 102, client(s) 104, network(s) 106, GUI manager 108, content recommender 110, dataset(s) 112, GUI 114, pre-processor 202, encoder 204, database of second feature vectors 206, comparator 208, retriever 210, prompt generator 212, large language model 214, and/or each of the components described therein, along with any components and/or subcomponents thereof, as well as the flowcharts/flow diagrams (e.g., flowcharts 300, 400A, 400B, 500, 600A, 600B and/or 600C) described herein, including portions thereof, and/or further examples described herein.

Storage 720 also stores data used and/or generated by operating system 712 and application programs 714 as application data 716. Examples of application data 716 include web pages, text, images, tables, sound files, video data, and other data, which may also be sent to and/or received from one or more network servers or other devices via one or more wired or wireless networks. Storage 720 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 702 through one or more input devices 730 and may receive information from computing device 702 through one or more output devices 750. Input device(s) 730 may include one or more of touch screen 732, microphone 734, camera 736, physical keyboard 738 and/or trackball 740 and output device(s) 750 may include one or more of speaker 752 and display 754. Each of input device(s) 730 and output device(s) 750 may be integral to computing device 702 (e.g., built into a housing of computing device 702) or external to computing device 702 (e.g., communicatively coupled wired or wirelessly to computing device 702 via wired interface(s) 780 and/or wireless modem(s) 760). Further input devices 730 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 754 may display information, as well as operating as touch screen 732 by receiving user commands and/or other information (e.g., by touch, finger gestures, virtual keyboard, etc.) as a user interface. Any number of each type of input device(s) 730 and output device(s) 750 may be present, including multiple microphones 734, multiple cameras 736, multiple speakers 752, and/or multiple displays 754.

One or more wireless modems 760 can be coupled to antenna(s) (not shown) of computing device 702 and can support two-way communications between processor 710 and devices external to computing device 702 through network 704, as would be understood to persons skilled in the relevant art(s). Wireless modem 760 is shown generically and can include a cellular modem 766 for communicating with one or more cellular networks, such as a GSM network for data and voice communications within a single cellular network, between cellular networks, or between the mobile device and a public switched telephone network (PSTN). Wireless modem 760 may also or alternatively include other radio-based modem types, such as a Bluetooth modem 764 (also referred to as a "Bluetooth device") and/or Wi-Fi 762 modem (also referred to as an "wireless adaptor"). Wi-Fi modem 762 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 764 is configured to communicate with another Bluetooth-capable device according to the Bluetooth short-range wireless technology standard(s) such as IEEE 802.15.1 and/or managed by the Bluetooth Special Interest Group (SIG).

Computing device 702 can further include power supply 782, LI receiver 784, accelerometer 786, and/or one or more wired interfaces 780. Example wired interfaces 780 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 780 of computing device 702 provide for wired connections between computing device 702 and network 704, or between computing device 702 and one or more devices/peripherals when such devices/peripherals are external to computing device 702 (e.g., a pointing device, display 754, speaker 752, camera 736, physical keyboard 738, etc.). Power supply 782 is configured to supply power to each of the components of computing device 702 and may receive power from a battery internal to computing device 702, and/or from a power cord plugged into a power port of computing device 702 (e.g., a USB port, an A/C power port). LI receiver 784 may be used for location determination of computing device 702 and may include a satellite navigation receiver such as a Global Positioning System (GPS) receiver or may include other type of location determiner configured to determine location of computing device 702 based on received information (e.g., using cell tower triangulation, etc.). Accelerometer 786 may be present to determine an orientation of computing device 702.

Note that the illustrated components of computing device 702 are not required or all-inclusive, and fewer or greater numbers of components may be present as would be recognized by one skilled in the art. For example, computing device 702 may also include one or more of a gyroscope, barometer, proximity sensor, ambient light sensor, digital compass, etc. Processor 710 and memory 756 may be co-located in a same semiconductor device package, such as being included together in an integrated circuit chip, FPGA, or system-on-chip (SOC), optionally along with further components of computing device 702.

In embodiments, computing device 702 is configured to implement any of the above-described features of flowcharts herein. Computer program logic for performing any of the operations, steps, and/or functions described herein may be stored in storage 720 and executed by processor 710.

In some embodiments, server infrastructure 770 may be present in computing environment 700 and may be communicatively coupled with computing device 702 via network 704. Server infrastructure 770, when present, may be a network-accessible server set (e.g., a cloud-based environment or platform). As shown in FIG. 7, server infrastructure 770 includes clusters 772. Each of clusters 772 may comprise a group of one or more compute nodes and/or a group of one or more storage nodes. For example, as shown in FIG. 7, cluster 772 includes nodes 774. Each of nodes 774 are accessible via network 704 (e.g., in a "cloud-based" embodiment) to build, deploy, and manage applications and services. Any of nodes 774 may be a storage node that comprises a plurality of physical storage disks, SSDs, and/or other physical storage devices that are accessible via network 704 and are configured to store data associated with the applications and services managed by nodes 774. For example, as shown in FIG. 7, nodes 774 may store application data 778.

Each of nodes 774 may, as a compute node, comprise one or more server computers, server systems, and/or computing devices. For instance, a node 774 may include one or more of the components of computing device 702 disclosed herein. Each of nodes 774 may be configured to execute one or more software applications (or "applications") and/or services and/or manage hardware resources (e.g., processors, memory, etc.), which may be utilized by users (e.g., customers) of the network-accessible server set. For example, as shown in FIG. 7, nodes 774 may operate application programs 776. In an implementation, a node of nodes 774 may operate or comprise one or more virtual machines, with each virtual machine emulating a system architecture (e.g., an operating system), in an isolated manner, upon which applications such as application programs 776 may be executed.

In an embodiment, one or more of clusters 772 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 772 may be a datacenter in a distributed collection of datacenters. In embodiments, exemplary computing environment 700 comprises part of a cloud-based platform such as Amazon Web Services® of Amazon Web Services, Inc. or Google Cloud Platform™ of Google LLC, although these are only examples and are not intended to be limiting.

In an embodiment, computing device 702 may access application programs 776 for execution in any manner, such as by a client application and/or a browser at computing device 702. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 702 may additionally and/or alternatively synchronize copies of application programs 714 and/or application data 716 to be stored at network-based server infrastructure 770 as application programs 776 and/or application data 778. For instance, operating system 712 and/or application programs 714 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 720 at network-based server infrastructure 770.

In some embodiments, on-premises servers 792 may be present in computing environment 700 and may be communicatively coupled with computing device 702 via network 704. On-premises servers 792, when present, are hosted within an organization's infrastructure and, in many cases, physically onsite of a facility of that organization. On-premises servers 792 are controlled, administered, and maintained by IT (Information Technology) personnel of the organization or an IT partner to the organization. Application data 798 may be shared by on-premises servers 792 between computing devices of the organization, including computing device 702 (when part of an organization) through a local network of the organization, and/or through further networks accessible to the organization (including the Internet). Furthermore, on-premises servers 792 may serve applications such as application programs 796 to the computing devices of the organization, including computing device 702. Accordingly, on-premises servers 792 may include storage 794 (which includes one or more physical storage devices such as storage disks and/or SSDs) for storage of application programs 796 and application data 798 and may include one or more processors for execution of application programs 796. Still further, computing device 702 may be configured to synchronize copies of application programs 714 and/or application data 716 for backup storage at on-premises servers 792 as application programs 796 and/or application data 798.

Embodiments described herein may be implemented in one or more of computing device 702, network-based server infrastructure 770, and on-premises servers 792. For example, in some embodiments, computing device 702 may be used to implement systems, clients, or devices, or components/subcomponents thereof, disclosed elsewhere herein. In other embodiments, a combination of computing device 702, network-based server infrastructure 770, and/or on-premises servers 792 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 720. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 714) may be stored in storage 720. Such computer programs may also be received via wired interface(s) 780 and/or wireless modem(s) 760 over network 704. Such computer programs, when executed or loaded by an application, enable computing device 702 to implement features of embodiments discussed herein. Accordingly, such computer programs represent controllers of the computing device 702.

Embodiments are also directed to computer program products comprising computer code or instructions stored on any computer-readable medium or computer-readable storage medium. Such computer program products include the physical storage of storage 720 as well as further physical storage types.

IV. Additional Example Embodiments

In an embodiment, a method for recommending content includes receiving user contextual information; generating a first feature vector based at least on the user contextual information; comparing the first feature vector to a plurality of second feature vectors, which each correspond to a content item, to determine second feature vectors that satisfy a predetermined condition with respect to the first feature vector; retrieving the content items corresponding to the determined second feature vectors; providing, to a large language model, an augmented prompt generated based at least on the user contextual information and the retrieved content items; and receiving a recommendation from the large language model, the recommendation generated by the large language model based at least on the augmented prompt and the retrieved content items.

In an embodiment, the received recommendation comprises: a summary of a recommended content item, the summary generated by the large language model based at least on a recommended content item determined, by the large language model, to be most relevant to the user based at least on the augmented prompt; and a user-selectable link to the recommended content item.

In an embodiment, comparing the first feature vector to the plurality of second feature vectors comprises: determining cosine similarities between at least a portion of the first feature vector and corresponding portions of the plurality of second feature vectors.

In an embodiment, determining second feature vectors that satisfy a predetermined condition with respect to the first feature vector comprises: determining the second feature vectors having a cosine similarity to the first feature vector that satisfies a first predetermined relationship with a first predetermined threshold; determining a first predetermined number of second feature vectors having highest cosine similarities to the first feature vector; or determining a second predetermined number of second feature vectors having highest cosine similarities to the first feature vector that satisfy a second predetermined relationship with a second predetermined threshold.

In an embodiment, the augmented prompt comprises: a query requesting a recommendation for the user based at least on the retrieved content items; and the retrieved content items.

In an embodiment, generating the first feature vector comprises: encoding a concatenation of the user contextual information into a low-dimensional dense vector using a Generative Pre-Trained Transformer (GPT)-based or a Bidirectional Encoder Representations from Transformers (BERT)-based encoder, and wherein said second feature vectors are generated by encoding concatenations of user historical information, product information, and content information into low-dimensional dense vectors using the GPT-based or the BERT-based encoder.

In an embodiment, the user contextual information comprises one or more of: a user identifier; user profile information; user location information; temporal information; product or service information; user intent information; or user interest information.

In an embodiment, a system for recommending content includes: a processor; and a computer-readable storage medium comprising computer-executable instructions, that when executed by the processor, cause the processor to: receive user contextual information; generate a first feature vector based at least on the user contextual information; compare the first feature vector to a plurality of second feature vectors, which each correspond to a content item, to determine second feature vectors that satisfy a predetermined condition with respect to the first feature vector; retrieve the content items corresponding to the determined second feature vectors; provide, to a large language model, an augmented prompt generated based at least on the user contextual information and the retrieved content items; and receive a recommendation from the large language model, the recommendation generated by the large language model based at least on the augmented prompt and the retrieved content items.

In an embodiment, the received recommendation comprises: a summary of a recommended content item, the summary generated by the large language model based at least on a recommended content item determined, by the large language model, to be most relevant to the user based at least on the augmented prompt; and a user-selectable link to the recommended content item.

In an embodiment, comparing the first feature vector to the plurality of second feature vectors comprises: determining cosine similarities between at least a portion of the first feature vector and corresponding portions of the plurality of second feature vectors.

In an embodiment, determining second feature vectors that satisfy a predetermined condition with respect to the first feature vector comprises: determining the second feature vectors having a cosine similarity to the first feature vector that satisfies a first predetermined relationship with a first predetermined threshold; determining a first predetermined number of second feature vectors having highest cosine similarities to the first feature vector; or determining a second predetermined number of second feature vectors having highest cosine similarities to the first feature vector that satisfy a second predetermined relationship with a second predetermined threshold.

In an embodiment, the augmented prompt comprises: a query requesting a recommendation for the user based at least on the retrieved content items; and the retrieved content items.

In an embodiment, generating the first feature vector comprises: encoding a concatenation of the user contextual information into a low-dimensional dense vector using a Generative Pre-Trained Transformer (GPT)-based or a Bidirectional Encoder Representations from Transformers (BERT)-based encoder, and wherein said second feature vectors are generated by encoding concatenations of user historical information, product information, and content information into low-dimensional dense vectors using the GPT-based or the BERT-based encoder.

In an embodiment, the user contextual information comprises one or more of: a user identifier; user profile information; user location information; temporal information; product or service information; user intent information; or user interest information.

In an embodiment, a computer-readable storage medium comprising computer-executable instructions, that when executed by a processor, cause the processor to: receive user contextual information; generate a first feature vector based at least on the user contextual information; compare the first feature vector to a plurality of second feature vectors, which each correspond to a content item, to determine second feature vectors that satisfy a predetermined condition with respect to the first feature vector; retrieve the content items corresponding to the determined second feature vectors; provide, to a large language model, an augmented prompt generated based at least on the user contextual information and the retrieved content items; and receive a recommendation from the large language model, the recommendation generated by the large language model based at least on the augmented prompt and the retrieved content items.

In an embodiment, the received recommendation comprises: a summary of a recommended content item, the summary generated by the large language model based at least on a recommended content item determined, by the large language model, to be most relevant to the user based at least on the augmented prompt; and a user-selectable link to the recommended content item.

In an embodiment, comparing the first feature vector to the plurality of second feature vectors comprises: determining cosine similarities between at least a portion of the first feature vector and corresponding portions of the plurality of second feature vectors.

In an embodiment, determining second feature vectors that satisfy a predetermined condition with respect to the first feature vector comprises: determining the second feature vectors having a cosine similarity to the first feature vector that satisfies a first predetermined relationship with a first predetermined threshold; determining a first predetermined number of second feature vectors having highest cosine similarities to the first feature vector; or determining a second predetermined number of second feature vectors having highest cosine similarities to the first feature vector that satisfy a second predetermined relationship with a second predetermined threshold.

In an embodiment, the augmented prompt comprises: a query requesting a recommendation for the user based at least on the retrieved content items; and the retrieved content items.

In an embodiment, generating the first feature vector comprises: encoding a concatenation of the user contextual information into a low-dimensional dense vector using a Generative Pre-Trained Transformer (GPT)-based or a Bidirectional Encoder Representations from Transformers (BERT)-based encoder, and wherein said second feature vectors are generated by encoding concatenations of user historical information, product information, and content information into low-dimensional dense vectors using the GPT-based or the BERT-based encoder.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed:

1. A method for improving the relevancy of a content recommendation, comprising:
   receiving user contextual information comprising at least an identifier of a current webpage;
   encoding a concatenation of at least the user contextual information and a content of the current webpage into a first feature vector, the first feature vector comprising a low-dimensional dense vector;
   encoding concatenations of user historical information, product information, and content information into a plurality of second feature vectors, the second feature vectors comprising low-dimensional dense vectors;
   determining a cosine similarity between a first portion of the first feature vector and a corresponding portion of each of the plurality of second feature vectors, wherein determining the cosine similarity ignores a second portion of the first feature vector corresponding to user contextual information having a null value;
   retrieving text associated with a second feature vector having a cosine similarity to the first feature vector that satisfies a predetermined condition;
   providing, to a large language model, an augmented prompt generated based at least on the user contextual information and the retrieved text; and
   receiving, from the large language model and based on the augmented prompt, a summary of a recommended text.

2. The method of claim 1, wherein the summary comprises a user-selectable link to the recommended text.

3. The method of claim 1, wherein said retrieving text associated with a second feature vector comprises:
   determining the second feature vectors having a cosine similarity to the first feature vector that satisfies a first predetermined relationship with a first predetermined threshold;
   determining a first predetermined number of second feature vectors having highest cosine similarities to the first feature vector; or
   determining a second predetermined number of second feature vectors having highest cosine similarities to the first feature vector that satisfy a second predetermined relationship with a second predetermined threshold.

4. The method of claim 1, wherein the augmented prompt comprises:
   a query requesting a recommendation for a user based at least on the retrieved text; and
   the retrieved text.

5. The method of claim 1, wherein at least one of the first feature vector or the plurality of second feature vectors is encoded:
   using a Generative Pre-Trained Transformer (GPT)-based or a Bidirectional Encoder Representations from Transformers (BERT)-based encoder.

6. The method of claim 1, wherein the user contextual information comprises one or more of:
   a user identifier;
   user profile information;
   user location information;

temporal information;
   product or service information;
   user intent information; or
   user interest information.

7. The method of claim 1, further comprising:
   providing the summary of the recommended text to a user device.

8. A system for improving the relevancy of a content recommendation, comprising:
   a processor; and
   a computer-readable storage medium comprising computer-executable instructions, that when executed by the processor, cause the processor to:
      receive user contextual information comprising at least an identifier of a current webpage;
      encoding a concatenation of at least the user contextual information and a content of the current webpage into a first feature vector, the first feature vector comprising a low-dimensional dense vector;
      encode concatenations of user historical information, product information, and content information into a plurality of second feature vectors, the second feature vectors comprising low-dimensional dense vectors;
      determine a cosine similarity between a first portion of the first feature vector and a corresponding portion of each of the plurality of second feature vectors, wherein determining the cosine similarity ignores a second portion of the first feature vector corresponding to user contextual information having a null value;
      retrieve text associated with a second feature vector having a cosine similarity to the first feature vector that satisfies a predetermined condition;
      provide, to a large language model, an augmented prompt generated based at least on the user contextual information and the retrieved text; and
      receive, from the large language model and based on the augmented prompt, a summary of a recommended text.

9. The system of claim 8, wherein the summary comprises a user-selectable link to the recommended text.

10. The system of claim 8, wherein said retrieve text associated with a second feature vector comprises:
   determining the second feature vectors having a cosine similarity to the first feature vector that satisfies a first predetermined relationship with a first predetermined threshold;
   determining a first predetermined number of second feature vectors having highest cosine similarities to the first feature vector; or
   determining a second predetermined number of second feature vectors having highest cosine similarities to the first feature vector that satisfy a second predetermined relationship with a second predetermined threshold.

11. The system of claim 8, wherein the augmented prompt comprises:
   a query requesting a recommendation for a user based at least on the retrieved text; and
   the retrieved text.

12. The system of claim 8, wherein at least one of the first feature vector or the plurality of second feature vectors is encoded
   using a Generative Pre-Trained Transformer (GPT)-based or a Bidirectional Encoder Representations from Transformers (BERT)-based encoder.

13. The system of claim 8, wherein the user contextual information comprises one or more of:

a user identifier;

user profile information;

user location information;

temporal information;

product or service information;

user intent information; or user interest information.

14. The system of claim 8, wherein the computer-executable instructions, when executed by the processor, further cause the processor to:

provide the summary of the recommended text to a user device.

15. A computer-readable storage medium comprising computer-executable instructions, that when executed by a processor, cause the processor to:

receive user contextual information comprising at least an identifier of a current webpage;

encoding a concatenation of at least the user contextual information and a content of the current webpage into a first feature vector, the first feature vector comprising a low-dimensional dense vector;

encode concatenations of user historical information, product information, and content information into a plurality of second feature vectors, the second feature vectors comprising low-dimensional dense vectors;

determine a cosine similarity between a first portion of the first feature vector and a corresponding portion of each of the plurality of second feature vectors, wherein determining the cosine similarity ignores a second portion of the first feature vector corresponding to user contextual information having a null value;

retrieve text associated with a second feature vector having a cosine similarity to the first feature vector that satisfies a predetermined condition;

provide, to a large language model, an augmented prompt generated based at least on the user contextual information and the retrieved text; and receive, from the large language model and based on the augmented prompt, a summary of a recommended text.

16. The computer-readable storage medium of claim 15, wherein the summary comprises a user-selectable link to the recommended text.

17. The computer-readable storage medium of claim 15, wherein said retrieve text associated with a second feature vector comprises:

determining the second feature vectors having a cosine similarity to the first feature vector that satisfies a first predetermined relationship with a first predetermined threshold;

determining a first predetermined number of second feature vectors having highest cosine similarities to the first feature vector; or determining a second predetermined number of second feature vectors having highest cosine similarities to the first feature vector that satisfy a second predetermined relationship with a second predetermined threshold.

18. The computer-readable storage medium of claim 15, wherein the augmented prompt comprises:

a query requesting a recommendation for a user based at least on the retrieved text; and the retrieved text.

19. The computer-readable storage medium of claim 15, wherein at least one of the first feature vector or the plurality of second feature vectors is encoded using a Generative Pre-Trained Transformer (GPT)-based or a Bidirectional Encoder Representations from Transformers (BERT)-based encoder.

20. The computer-readable storage medium of claim 15, wherein the user contextual information comprises one or more of:

a user identifier;

user profile information;

user location information;

temporal information;

product or service information;

user intent information; or user interest information.

* * * * *